US009441646B2

(12) United States Patent
Shin et al.

(10) Patent No.: US 9,441,646 B2
(45) Date of Patent: Sep. 13, 2016

(54) HYDRAULIC SYSTEM FOR CONSTRUCTION MACHINE INCLUDING EMERGENCY CONTROL UNIT FOR ELECTRIC HYDRAULIC PUMP

(75) Inventors: Jung Mug Shin, Gyeonggi-do (KR); Duck Woo Park, Incheon (KR); Woo Yong Jung, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 568 days.

(21) Appl. No.: 13/993,961

(22) PCT Filed: Dec. 21, 2011

(86) PCT No.: PCT/KR2011/009907

§ 371 (c)(1), (2), (4) Date: Jun. 13, 2013

(87) PCT Pub. No.: WO2012/087012

PCT Pub. Date: Jun. 28, 2012

(65) Prior Publication Data

US 2013/0255244 A1 Oct. 3, 2013

(30) Foreign Application Priority Data

Dec. 24, 2010 (KR) ........................ 10-2010-0134610

(51) Int. Cl.

| | |
|---|---|
| ***B62D 11/00*** | (2006.01) |
| ***F15B 15/20*** | (2006.01) |
| ***E02F 9/22*** | (2006.01) |
| ***F15B 20/00*** | (2006.01) |

(52) U.S. Cl.

CPC ............... *F15B 15/20* (2013.01); *E02F 9/226* (2013.01); *E02F 9/2235* (2013.01); (Continued)

(58) Field of Classification Search

CPC ..... E02F 9/2242; E02F 9/2246; E02F 9/226; E02F 9/267; E02F 9/268; F15B 2211/8757; F15B 2211/8752; F15B 20/002

USPC ........................................................... 60/403

See application file for complete search history.

(56) References Cited

U.S. PATENT DOCUMENTS 4,410,057 A * 10/1983 Johnson .................. B62D 5/32 180/406

(Continued)

FOREIGN PATENT DOCUMENTS

JP 2003-247511 A 9/2003
JP 2008-302787 A 12/2008

(Continued)

OTHER PUBLICATIONS

Search Report dated Jul. 9, 2012 and written in Korean with English translation attached for International Patent Application No. PCT/KR2011/009907 filed Dec. 21, 2011, 4 pages.

*Primary Examiner* — Nathaniel Wiehe
*Assistant Examiner* — Dustin T Nguyen
(74) *Attorney, Agent, or Firm* — John D. Veldhuis-Kroeze; Westman, Champlin & Koehler, P.A.

(57) ABSTRACT

The present disclosure relates to a hydraulic system for a construction machine which uses an electric hydraulic pump, and more particularly, to a hydraulic system including an emergency control unit for temporarily driving the construction machine when an electronic control unit controlling the electric hydraulic pumps fails to operate. To this end, disclosed is the hydraulic system including the electric hydraulic pump, the electric control unit for controlling the electric hydraulic pump, and the emergency control unit, which operates when the electric control unit fails to operate, so as to temporarily control the electric hydraulic pump in accordance with to a predetermined condition, which can effectively respond to a low load work corresponding to predetermined pressure and to a high load work corresponding to higher pressure, by selectively operating the emergency control unit according to different optional conditions, based on the amount of load (low load, high load) of the working machine that is required when the electric control unit fails to operate.

4 Claims, 10 Drawing Sheets

(52) U.S. Cl.
CPC .......... *E02F 9/2242* (2013.01); *E02F 9/2282* (2013.01); *E02F 9/2292* (2013.01); *E02F 9/2296* (2013.01); *F15B 20/00* (2013.01); *F15B 2211/20515* (2013.01); *F15B 2211/20546* (2013.01); *F15B 2211/20576* (2013.01); *F15B 2211/3111* (2013.01); *F15B 2211/3127* (2013.01); *F15B 2211/3144* (2013.01); *F15B 2211/8752* (2013.01)

(56) References Cited

U.S. PATENT DOCUMENTS 5,299,420 A * 4/1994 Devier .................... E02F 9/22 137/596.16
8,726,645 B2 * 5/2014 Shang .................... E02F 9/123 60/414
2003/0145588 A1 * 8/2003 Kubinski .................. F15B 7/08 60/475
2007/0205026 A1 * 9/2007 Lee ...................... E02F 9/2242 180/6.48

FOREIGN PATENT DOCUMENTS

KR 10-1997-0015340 A 4/1997
KR 10-2010-0075300 A 7/2010

* cited by examiner

HYDRAULIC SYSTEM FOR CONSTRUCTION MACHINE INCLUDING EMERGENCY CONTROL UNIT FOR ELECTRIC HYDRAULIC PUMP

CROSS-REFERENCE TO RELATED APPLICATION

This Application is a Section 371 National Stage Application of International Application No. PCT/KR2011/009907, filed Dec. 21, 2011 and published, not in English, as WO2012/087012 on Jun. 28, 2012.

FIELD OF THE DISCLOSURE

The present disclosure relates to a hydraulic system for a construction machine using an electric hydraulic pump, and more particularly, to a hydraulic system including an emergency control unit for temporarily driving a construction machine when an electronic control unit controlling an electric hydraulic pump fails to operate.

BACKGROUND OF THE DISCLOSURE

A construction machine, such as an excavator and a wheel loader, generally includes a hydraulic pump driven by an engine, and a hydraulic system for driving a plurality or working machines, such as a boom, an arm, a bucket, a travel motor, and a turning motor, through pressure of working oil discharged from the hydraulic pump.

The hydraulic pump used in the hydraulic system of the construction machine is a variable capacity type pump including a swash plate formed inside the pump and an adjusting device for adjusting an angle of the swash plate (swash plate angle), and especially, may be divided into a machine control type or an electronic control type according to a type of an instruction input in the adjusting device in order to adjust the swash plate angle.

The initial hydraulic pump mainly employs the machine control method, but the electronic control type for controlling the swash plate angle by applying an electric signal to the adjusting device has been introduced today. The hydraulic pump of the electronic control type includes a so-called pressure control type electric hydraulic pump.

The pressure control type electric hydraulic pump is controlled by a control means, such as an electronic control unit.

The electronic control unit receives a value of a pressure sensor according to an operation of a lever, such as a joystick, within an operation seat of a construction machine, and a value of a swash plate angle from a sensor mounted inside the electric hydraulic pump as electric signals, respectively, and outputs the electric signal for controlling pressure to the corresponding electric hydraulic pump.

For example, the electronic control unit includes an input unit for receiving the values detected from the sensors, a calculation unit for generating a corresponding control signal based on the input value, and an output unit for outputting the control signal to the electric hydraulic pump.

In a case of a construction machine using the electric hydraulic pump, when the electronic control unit fails to operate, for example, when any one of the input unit receiving the electric signal and the output unit outputting the control signal has failure, the electric hydraulic pump may not be normally controlled, thereby causing an even worst risk, such as failure of driving the construction machine itself using the electric hydraulic pump.

Accordingly, a method of handling an emergency situation, such as operation failure of the electronic control unit is prepared by providing an emergency control unit so as to temporarily control the electric hydraulic pump when the electronic control unit fails to operate.

FIG. 1 is a hydraulic circuit diagram illustrating an example of a hydraulic system using an electric hydraulic pump in the related art.

Referring to FIG. 1, a construction machine includes first and second electric hydraulic pumps 10*a* and 10*b* driven by an engine, a plurality of main control valves 20*a*, 20*b*, 20*c*, and 20*d* for controlling a flow of working oil discharged from the electric hydraulic pump, first and second travel motors 30*a* and 30*b* which may be driven with the working oil supplied from the main control valves, and a plurality of working machines 40*a* and 40*b*.

Further, the construction machine includes a predetermined hydraulic line forming a path, through which the working oil is transferred, by connecting the pumps, the main control valves, the working machines, and the like, and further includes a straight travel control valve 70 capable of changing a supply path of the working oil for the travel motors 30*a* and 30*b* and the working machines 40*a* and 40*b* on the hydraulic line between the pumps and the main control valves.

Further, the construction machine includes adjusting devices 12*a* and 12*b* for adjusting a swash plate angle of the first and second electric hydraulic pumps 10*a* and 10*b*, and an electronic control unit 50 capable of controlling the adjusting devices, and the electronic control unit 50 receives a pressure signal 80 of a joystick (not illustrated) and flow signals (for example, angle detection signal of the swash plate angle) 14*a* and 14*b* of the respective pumps 10*a* and 10*b* and generates corresponding control signals 52*a*, 52*b*, and 54, and outputs the control signals to the adjusting devices 12*a* and 12*b* and the straight travel control valve 70 of each pump.

Further, the construction machine further includes an emergency control unit 60 for preparing operation failure of the electronic control unit in the hydraulic system.

FIG. 2 is a logic circuit diagram illustrating an example of the emergency control unit 60 of FIG. 1. Referring to FIG. 2, when the electronic control unit (reference numeral 50 of FIG. 1) fails to operate, the emergency control unit 60 may switch, for example, a path of a control signal transmitted from input ports 62A and 62B to output ports 62*a* and 62*b* to a substitute path through which the control signal is transmitted from a regular power source 64, such as a battery, to the output ports 62*a* and 62*b* through an operation of a switch SW.

That is, a path with a solid line (the control signal transmitted from the input ports) may be switched to a path with a dotted line (the control signal transmitted from the regular power source) based on the switch of FIG. 2.

In this case, the control signal of the regular power source 64 transmitted to the output ports 62*a* and 62*b* may be determined as a predetermined value through resistors R1 and R2 arranged on the path.

The emergency control unit including the aforementioned configuration in the related art is configured so that the respective electric hydraulic pumps 10*a* and 10*b* maintain the predetermined same flow, and thus the construction machine may perform load work with pressure equal to or lower than predetermined pressure at an emergency situation where the electronic control unit fails to operate.

That is, regardless of the electronic control unit, the electric hydraulic pump may be temporarily controlled so that the construction machine may minimally perform work or travel.

FIG. 3 is a graph illustrating a relationship between pressure and the quantity of flow when the electric hydraulic pump is driven according to an operation of the emergency control unit. As illustrated in FIG. 3, in the hydraulic system in the related art, when it is assumed that the maximum quantity of outlet flow of one electric hydraulic pump at the RPM of a rated load of the engine is Qmax, the quantity of outlet flow of the hydraulic system in the related art is fixed as a maximum value of 2×Qmax according to the operation of the emergency control unit, and load work corresponding to predetermined pressure (for example, P1) may be performed at the maximum quantity of flow.

The load work corresponding to P1 may generally be low load work, such as minimum driving or travel of the working machine.

However, when load work (for example, high load work) corresponding to higher pressure than the predetermined pressure P1 is desired to be performed, load equal to or larger than power of the engine is applied to the pump, so that the engine is stalled, thereby resulting in the worst situation where driving itself of the construction machine is impossible.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An object of the present disclosure is to provide an emergency control unit capable of temporarily controlling an electric hydraulic pump in a case where an electronic control unit fails to operate in a construction machine using the electric hydraulic pump.

Another object of the present disclosure is to provide a hydraulic system capable of being selectively driven with different settings of low load and high load according to the amount of load of a working machine required by an electric hydraulic pump, which is temporarily controlled by an emergency control unit.

Yet another object of the present disclosure is to provide a hydraulic system for enabling an electric hydraulic pump of a construction machine to discharge working oil with the appropriate quantity of flow in response to low load work and high load work by providing a logic circuit of an emergency control unit for selectively controlling the electric hydraulic pump.

In order to achieve the object, the present disclosure provides a hydraulic system of a construction machine including an emergency control unit for an electric hydraulic pump, the hydraulic system including: first and second electric hydraulic pumps, which are pressure control type variable capacity pumps; a plurality of main control valves configured to selectively control a flow of working oil discharged from the first and second electric hydraulic pumps; a plurality of working machines and first and second travel motors driven through the working oil supplied from each corresponding main control valve among the plurality of main control valves; a straight travel control valve configured to set a supply path of the working oil supplied to the first and second travel motors; an electronic control unit configured to control the quantity of outlet flow of the working oil of the first and second electric hydraulic pumps by outputting pressure control electric signals for the first and second electric hydraulic pumps based on flow signals of the first and second electric hydraulic pumps and an operation signal of a joystick within an operation seat; and an emergency control unit configured to output predetermined pressure control electric signals for the first and second electric hydraulic pumps when the electronic control unit fails to operate, wherein the emergency control unit is configured to selectively control the quantity of outlet flow of the first and second electric hydraulic pumps according to the amount of load of the working machines.

In an embodiment of the present disclosure, when the amount of load of the working machine is a low load, the emergency control unit is configured to output the predetermined pressure control electric signal with the same pressure for the first and second electric hydraulic pumps, and when the amount of load of the working machine is a high load, the emergency control unit is configured to output the predetermined pressure control electric signal with pressure, which is higher than that of the case of the low load, for one pump between the first and second electric hydraulic pumps.

Further, in an embodiment of the present disclosure, when the amount of load of the working machine is the high load, the emergency control unit is configured to output a driving electric signal for the straight travel control valve to drive the straight travel control valve.

Further, in an embodiment of the present disclosure, the emergency control unit includes an electric circuit unit including: respective output ports configured to output electric signals to the straight travel control valve, and the first and second electric hydraulic pumps; respective input ports connected with the respective output ports through a predetermined circuit, and configured to receive corresponding electric signals of the electronic control unit; and a regular power source connected with the respective output ports through switches arranged on the predetermined circuit, and configured to output a predetermined electric signal when the electronic control unit fails to operate, wherein the predetermined electric signal can be selectively supplied to the output ports through an operation of the switches according to the amount of load of the working machine.

Further, in an embodiment of the present disclosure, the switches operate the first and second electric hydraulic pumps for the low load, and operate only one pump between the first and second electric hydraulic pumps while driving the straight travel control valve for the high load.

According to the present disclosure, it is possible to provide the emergency control unit capable of temporarily controlling an electric hydraulic pump in a case where an electronic control unit fails to operate in a construction machine using the electric hydraulic pump.

Further, it is possible to provide the hydraulic system capable of being selectively driven with different settings of low load and high load according to the amount of load of a working machine required by an electric hydraulic pump, which is temporarily controlled by an emergency control unit.

Furthermore, it is possible to provide the hydraulic system for enabling an electric hydraulic pump of a construction machine to discharge working oil with the appropriate quantity of flow in response to low load work and high load work by providing a logic circuit of an emergency control unit for selectively controlling the electric hydraulic pump.

DESCRIPTION OF REFERENCE NUMERALS

Figure 1:
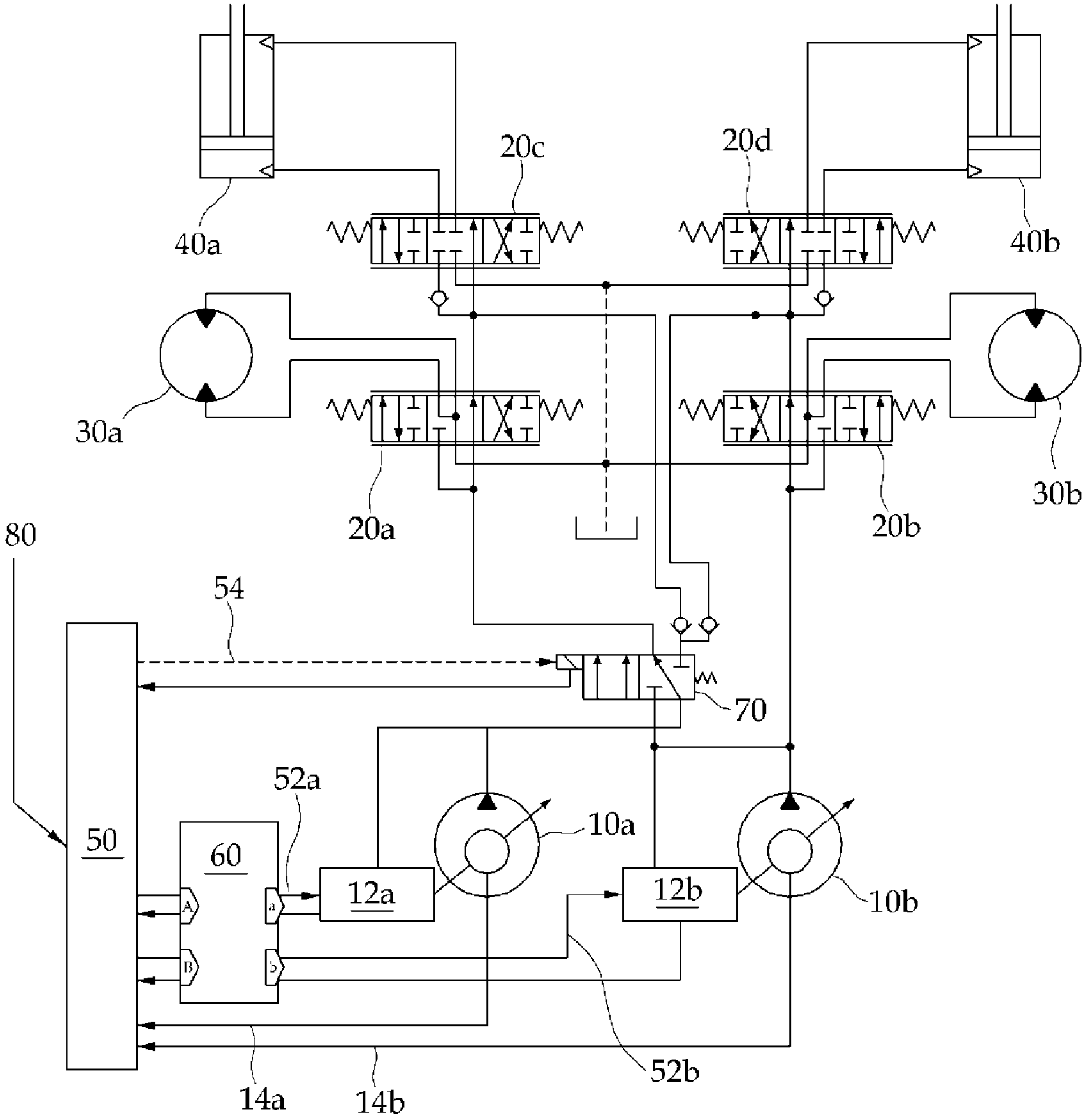
FIG. 1 is a hydraulic circuit diagram illustrating an example of a hydraulic system using an electric hydraulic pump in the related art.
Figure 2:
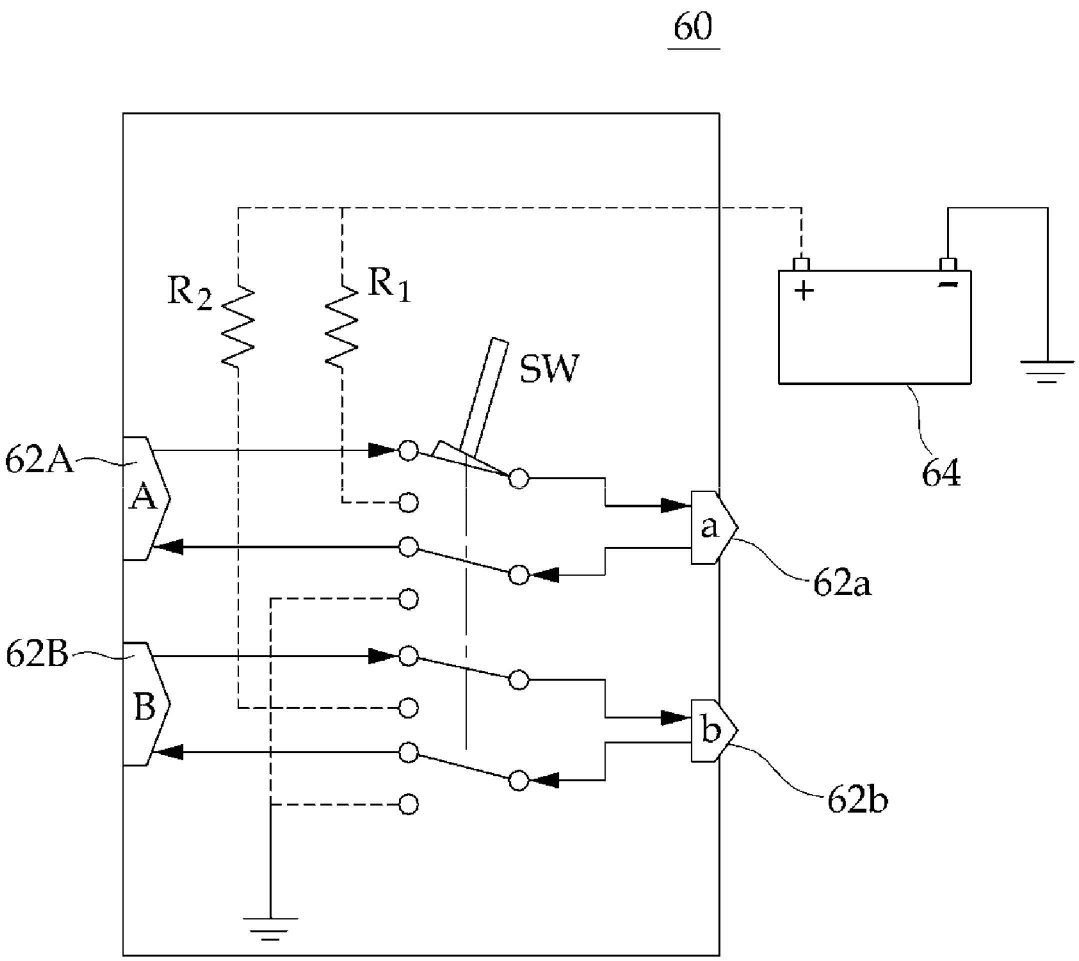
FIG. 2 is a logic circuit diagram illustrating an example of an emergency control unit of FIG. 1.

100: Hydraulic system
110*a*, 110*b*: Electric hydraulic pump
112*a*, 112*b*: Adjusting device
114*a*, 114*b*: Flow signal
120*a*, 120*b*, 120*c*, 120*d*: Main control valve
130*a*, 130*b*: Travel motor
140*a*, 140*b*: Working machine
150: Electronic control unit
152*a*, 152*b*: Control signal for electric hydraulic pump
154: Control signal for straight travel control valve
160: Emergency control unit
162A, 162B, 162D: Input port
162*a*, 162*b*, 162*d*: Output port
164: Regular power source
170: Straight travel control valve
180: Operation signal
R1, R2, R3, R4: Resistor
SW1, SW2: Switch
ST_Off: Disconnection switch

DETAILED DESCRIPTION

Hereinafter, an exemplary embodiment of the present disclosure will be described with reference to the accompanying drawings.

Figure 4:
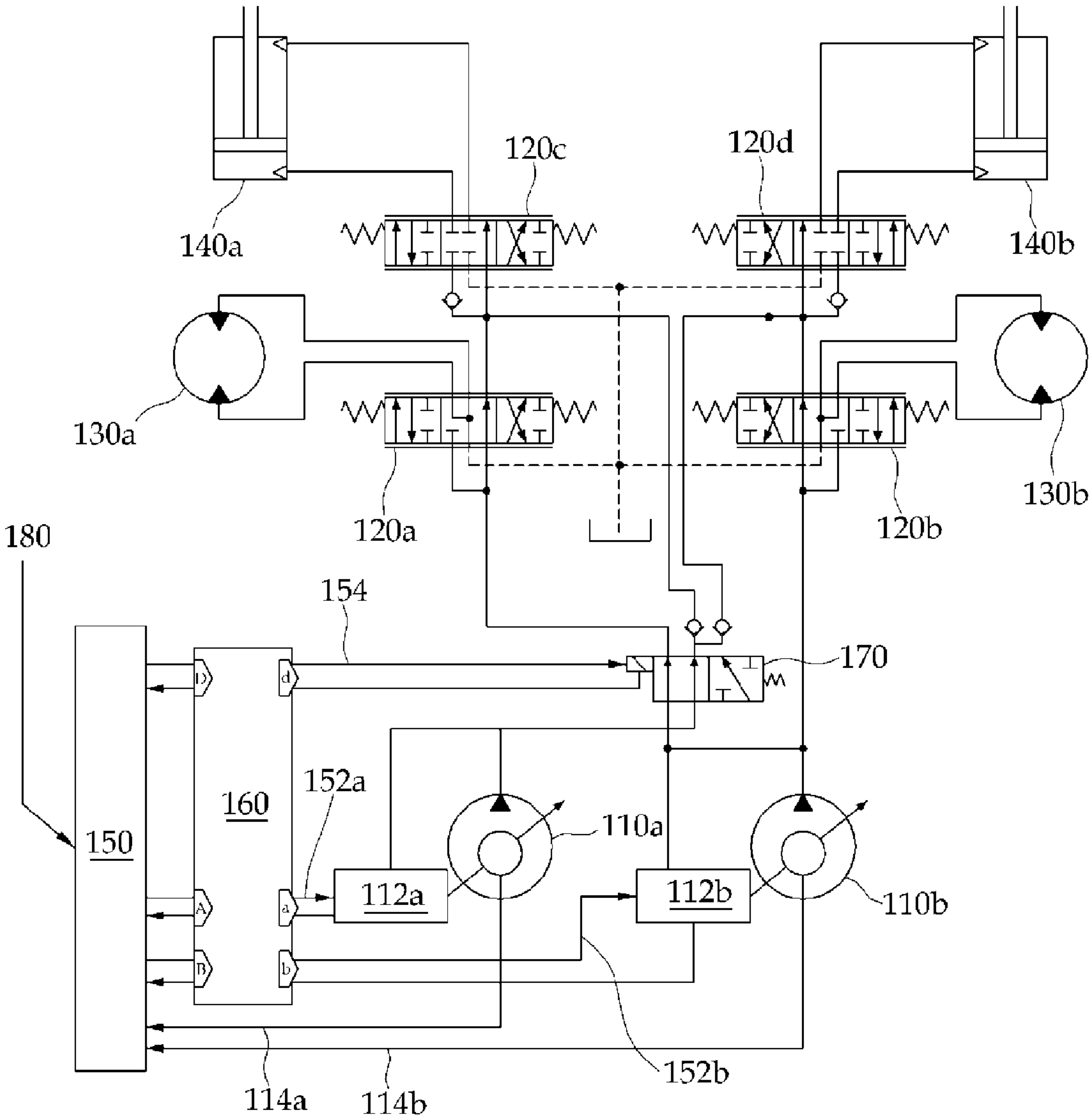
FIG. 4 is a hydraulic circuit diagram illustrating a hydraulic system using an electric hydraulic pump according to an exemplary embodiment of the present disclosure.

FIG. 4 is a hydraulic circuit diagram illustrating a hydraulic system using an electric hydraulic pump according to an exemplary embodiment of the present disclosure.

For reference, the hydraulic circuit diagram suggested in the present disclosure is a simplified circuit diagram for describing a characteristic of the present disclosure, and it is noted that pilot pressure for piloting control of each main control valve, and the like, a hydraulic line for driving a spool inside the main control valve, and the like are omitted.

Referring to FIG. 4, a construction machine includes first and second electric hydraulic pumps 110*a* and 110*b* driven by an engine, a plurality of main control valves 120*a*, 120*b*, 120*c*, and 120*d* for controlling a flow of working oil discharged from the electric hydraulic pump, first and second travel motors 130*a* and 130*b* which may be driven with the working oil supplied from the main control valves, and a plurality of working machines 140*a* and 140*b*.

For reference, the two working machines are illustrated in the hydraulic system of FIG. 4, but the present disclosure is not limited thereto, and it is obvious that the hydraulic system may further include an additional number of working machines and related main control valves.

Further, the hydraulic system includes a predetermined hydraulic line forming a path, through which the working oil is transferred, by connecting the pumps, the main control valves, the working machines, and the like, and further includes a straight travel control valve 70 capable of changing a supply path of the working oil for the travel motors 130*a* and 30*b* and the working machines 140*a* and 40*b* on the hydraulic line between the pumps and the main control valves.

In the present exemplary embodiment, when the straight travel control valve 170 is driven, for example, when the valve is positioned at a right side based on the drawing, the first electric hydraulic pump 110*a* may supply the working oil only to the plurality of working machines 140*a* and 140*b*, and the second electric hydraulic pump 110*b* may supply the working oil to the first and second travel motors 130*a* and 130*b* and the plurality of working machines 140*a* and 140*b*.

Contrary to this, when the straight travel control valve 170 is not driven, for example, when the valve is positioned at a left side based on the drawing, the working oil discharged from the first electric hydraulic pump 110*a* is supplied to the working machines (for example, the first travel motor 130*a* and the working machine 140*a*) arranged at the left side based on the drawing, and the working oil discharged from the second electric hydraulic pump 110*b* is supplied to the working machines (for example, the second travel motor 130*b* and the working machines 140*b*) arranged at the right side based on the drawing.

Further, the hydraulic system includes adjusting devices 112*a* and 112*b* for adjusting the quantity of outlet flow by controlling a swash plate angle of the first and second electric hydraulic pumps 110*a* and 110*b*, and an electronic control unit 150 capable of controlling the adjusting devices, and the electronic control unit 150 receives a pressure signal 180 of a joystick (not illustrated) within an operation seat, and flow signals (for example, an angle detection signal of the swash plate angle) 114*a* and 114*b* of the respective pumps 110*a* and 110*b* and generates corresponding control signals 152*a*, 152*b*, and 154, and outputs the control signals to the adjusting devices 112*a* and 112*b* and the straight travel control valve 170 of the respective pumps.

Further, the hydraulic system further includes an emergency control unit 160 for preparing operation failure of the electronic control unit. For example, when the electronic control unit 150 fails to operate, the emergency control unit 160 outputs an emergency control signal, such as a predetermined electric value, to the electric hydraulic pumps 110 and 110*b*, and the straight travel control valve 170, thereby enabling the construction machine to be temporarily driven.

Figure 5:
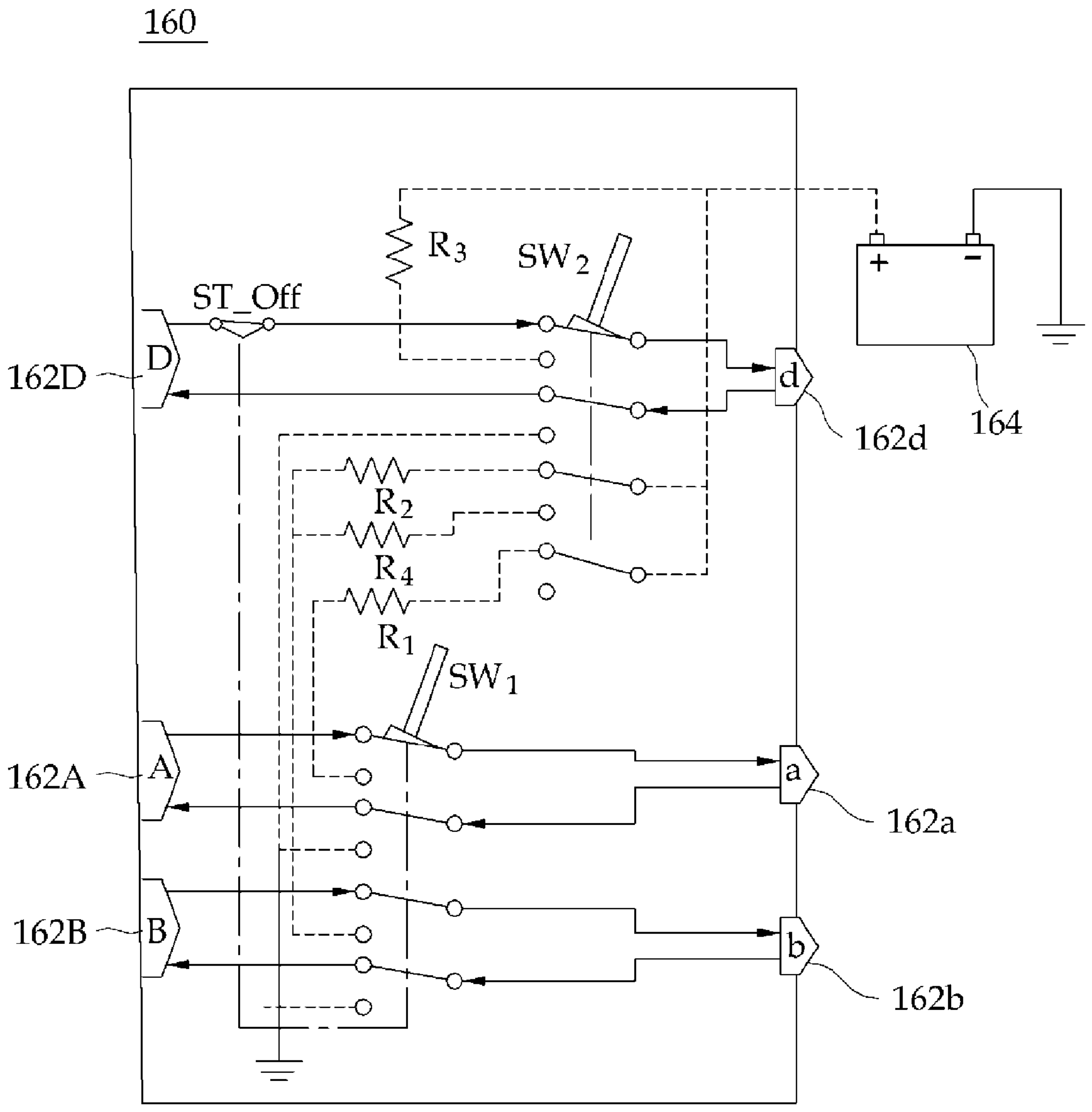
FIG. 5 is a logic circuit diagram illustrating an example of an emergency control unit of FIG. 4.

FIG. 5 is a logic circuit diagram illustrating an example of the emergency control unit 160 of FIG. 4. Referring to FIG. 5, when the electronic control unit (reference numeral 150 of FIG. 4) fails to operate, the emergency control unit 160 may switch, for example, a path of a control signal transmitted from input ports 162A, 162B, and 162D to output ports 162*a*, 162*b*, and 162*d* to a substitute path through which the control signal is transmitted from a regular power source 164, such as a battery, to the output ports 162*a*, 162*b*, and 162*d* through an operation of switches SW1 and SW2.

That is, a path with a solid line (the control signal transmitted from the input ports) may be switched to a path with a dotted line (the control signal transmitted from the regular power source) based on the switches SW1 and SW2 of FIG. 5.

In this case, the control signal of the regular power source 64 transmitted to the output ports 162*a*, 162*b*, and 162*d* may be determined as a predetermined value through resistors R1, R2, R3, and R4 arranged on the path.

Further, since the two switches SW1 and SW2 may be selectively operated, the path of the control signal may be selectively set according to, for example, the low load work and the high load work, if necessary.

In the meantime, contrary to the related art, the emergency control unit 160 of the present disclosure further includes a signal path for the straight travel control valve 170, a disconnection switch ST_OFF is disposed in the signal path, and the disconnection switch ST_Off is connected with the first switch SW1, so that the emergency control unit 160 is configured so as to basically block the driving signal of the electronic control unit for the straight travel control valve by operating the first switch SW1 when the electronic control unit fails to operate.

The emergency control unit of the present disclosure including the aforementioned configuration is configured so that, for example, the respective electric hydraulic pumps 110*a* and 110*b* may be selectively driven with the predetermined even pressure, or only one electric hydraulic pump (for example, the electric hydraulic pump 110*b*) may be driven with a predetermined higher pressure, and thus, the emergency control unit is configured so that the construction machine may selectively respond to the low load work and the high load work when the electronic control unit is in an emergency situation where the electronic control unit fails to operate.

For example, the hydraulic system including the emergency control unit 160 of the present disclosure is configured so that when the low load work is required, the respective electric hydraulic pumps 110*a* and 110*b* discharge the same quantity of oil by outputting the electric signals with the same pressure to the first and second electric hydraulic pumps 110*a* and 110*b* similar to the related art, but contrary to this, when the high load work is required, only one (for example, the second electric hydraulic pump 110*b*) between the first and second electric hydraulic pumps discharges the predetermined quantity of oil to perform the relatively high load work.

A detailed description will be given below based on a case of a high load and a low load with reference to the drawing. The drawings are basically based on FIGS. 4 and 5, and a point discriminated according to a selective operation of the emergency control unit 160 will be basically described.

Figure 6:
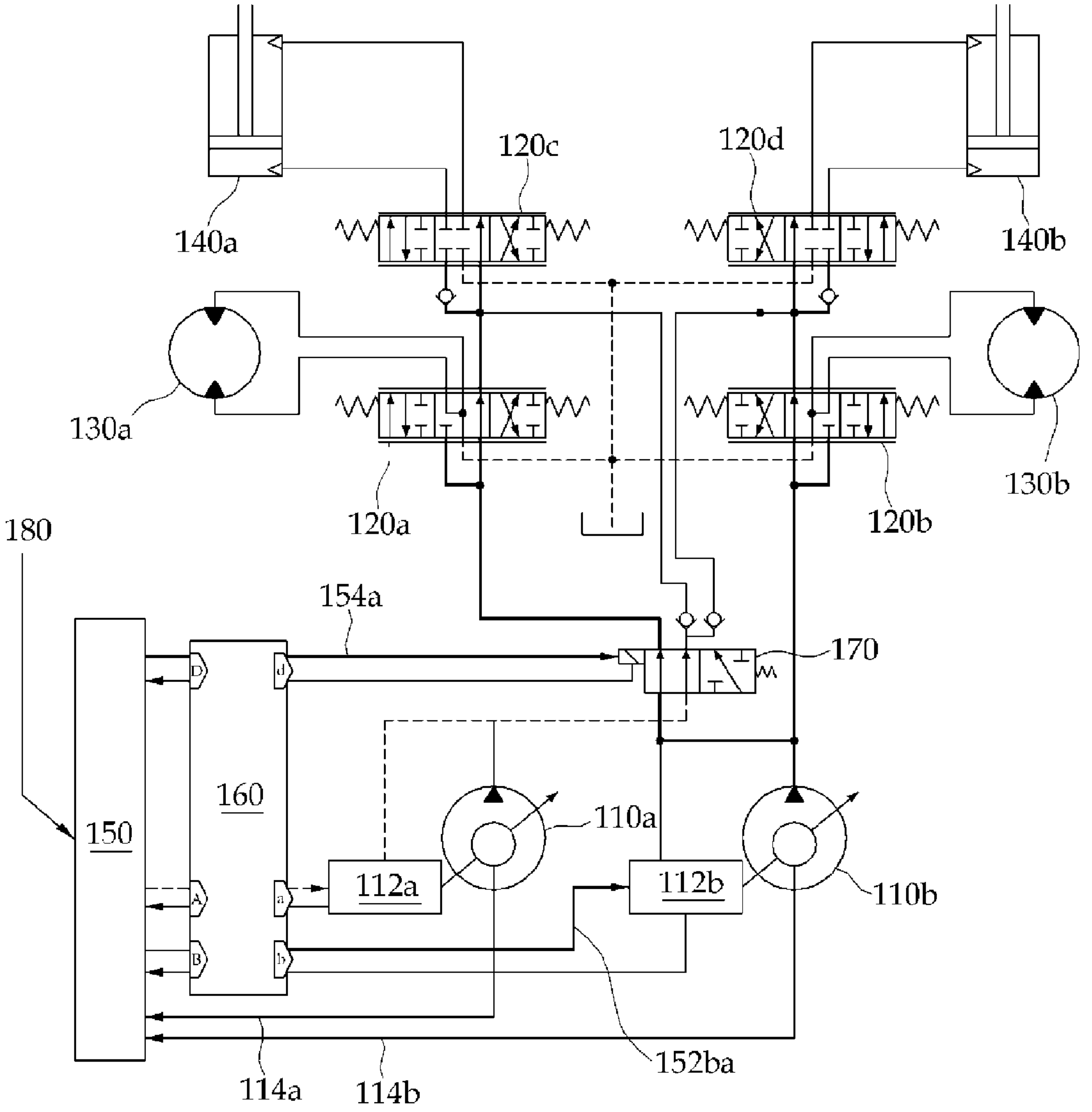
FIGS. 6 and 7 are a hydraulic circuit diagram of a corresponding hydraulic system and a logic circuit diagram of an emergency control unit in a case where the amount of load of a working machine is high load.
Figure 7:
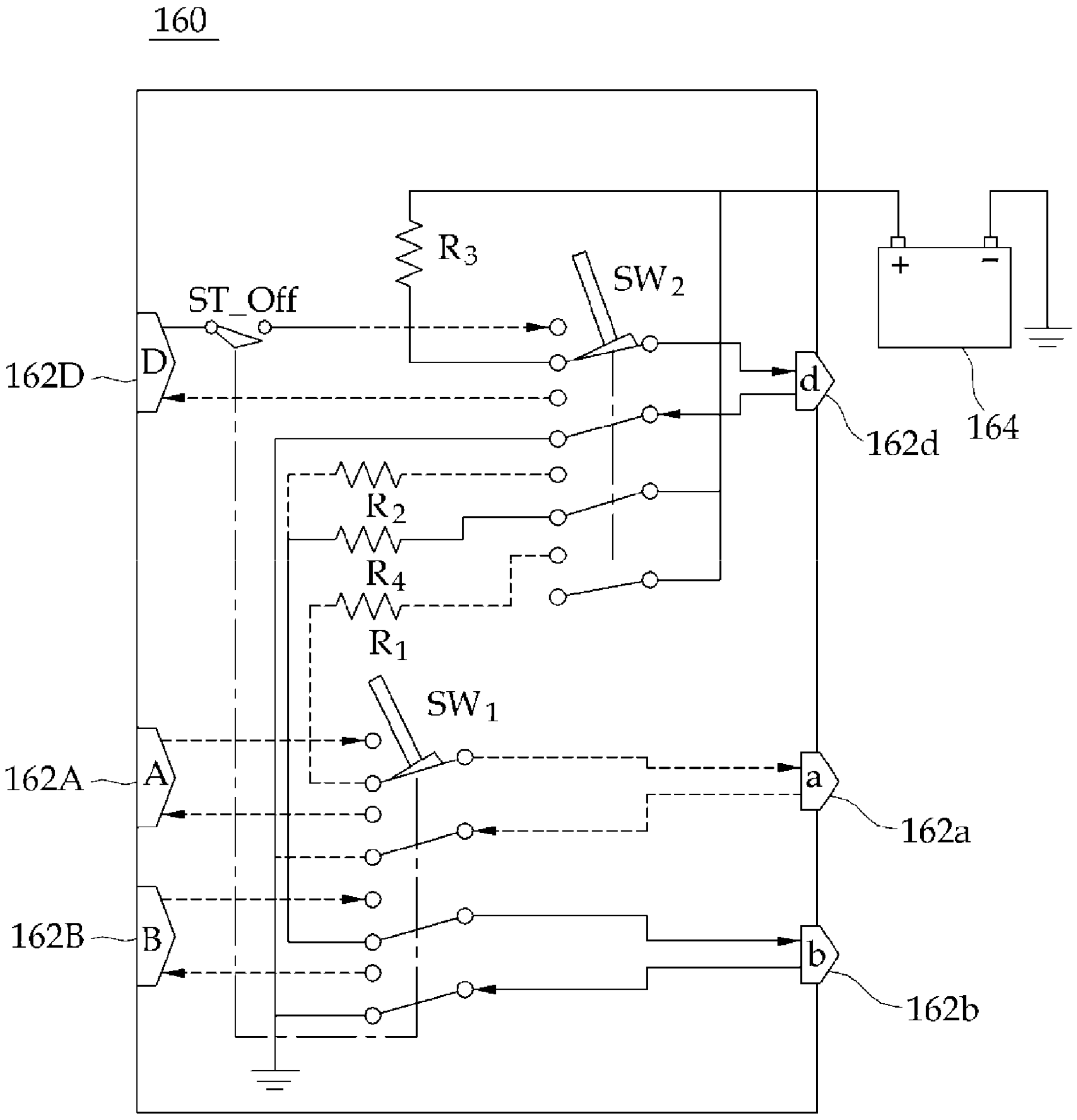
Figure 8:
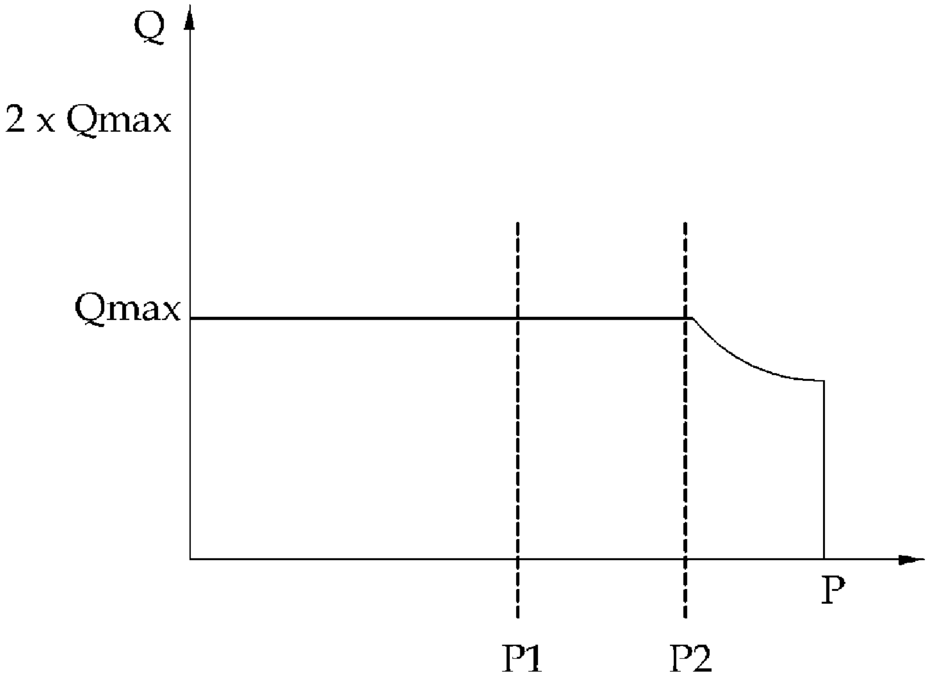
FIG. 8 is a graph illustrating a relationship between pressure and the quantity of flow in the hydraulic system of FIG. 6.

First, FIGS. 6 and 7 are a hydraulic circuit diagram of the hydraulic system and a logic circuit diagram of the emergency control unit thereof in a case where high load work is required. Further, FIG. 8 is a graph illustrating a correlation between the quantity of flow and pressure in the hydraulic system of FIG. 6.

As illustrated in FIG. 6, in a case of the high load work, the emergency control unit 160 is operated so as to perform the high load work demanding higher pressure than that of the low load work of the related art by driving the straight travel control valve 170 and only the second electric hydraulic pump 110*b*.

For example, in FIG. 6, the emergency control unit 160 outputs a control signal 154*a* for the straight travel control valve 170 and a control signal 152*ba* for the second electric hydraulic pump 110*b*.

According to the driving of the straight travel control valve 170, the supply of the working oil for the travel motors 130*a* and 130*b* and the working machines 140*a* and 140*b* is changed so as to be performed by only one pump, that is, the second electric hydraulic pump 110*b*, for example, a corresponding control signal is transferred along a path illustrated with a thick line in FIG. 6, and the working oil discharged from the second electric hydraulic pump 110*b* is supplied to the respective travel motors 130*a* and 130*b* and the working machines 140*a* and 140*b*.

Accordingly, contrary to the related art, since only one pump is driven, the working oil is supplied with the maximum quantity of flow Qmax lower than the maximum quantity of flow (that is, 2×Qmax) when the two pumps are driven in the related art, and thus load work corresponding to higher pressure (for example, pressure P2) than that of the related art may be performed.

That is, the characteristic of the present disclosure is that in a case where the high load work is required when the electronic control unit is in the emergency situation where the electronic control unit fails to operate, the emergency control unit is operated so as to set the maximum quantity of flow of the working oil supplied in the system to be lower than the existing quantity of flow (for example, from 2×Qmax to Qmax), so that the load work corresponding to the higher pressure (for example, from P1 to P2) may be performed. For example, the high load work corresponding to a portion with a deviant crease line in FIG. 8 may be performed.

Referring to FIG. 6 again, it can be seen that in order to drive the driving motors 130*a* and 130*b* and the working machines 140*a* and 140*b* with only one electric hydraulic pump 110*b*, the straight travel control valve 170 is in a driven state by receiving the control signal 154*a*.

For example, the working oil discharged from the second electric hydraulic pump 110 may be supplied to the group of main control valves 120*a* and 120*d* illustrated at the right side based on the drawing, and simultaneously may be supplied to the group of main control valves 120*a* and 120*c* illustrated at the left side through the straight travel control valve 170.

In this case, the working machines are driven with the smaller quantity of flow Qmax than the quantity of flow 2×Qmax of the related art, so that the load work corresponding to the higher pressure P2 (for example, the high load work) compared to the load work of the related art corresponding to the pressure P1 (for example, the low load work) may be performed.

Accordingly, contrary to the related art, even though the high load work is performed, the load equal to or larger than the power of the engine is not applied to the pump, so that it is possible to solve the disadvantage, such as a stall of the engine, of the related art.

As described above, in the case of the high load work, the emergency control unit 160 is operated as illustrated in FIG. 7, thereby outputting the required control signals 152*ba* and 154*a*. FIG. 7 represents a state where both the first switch SW1 and the second switch SW2 are operated in the circuit diagram of FIG. 5.

The first switch SW1 is operated, so that the disconnection valve ST_Off for the straight travel control valve is driven, and thus the output port 162*d* for the straight travel control valve is disconnected, and the regular power source 164 is connected for the output ports 162*a* and 162*b* for the first and second electric hydraulic pumps.

Further, the second switch SW2 is operated, so that the regular power source 164 is connected for the output port 162*d* for the straight travel control valve, and simultaneously the regular power source for the output port 162*a* for the first electric hydraulic pump is disconnected.

Accordingly, in a case of FIG. 7 in which both the first and second switches SW1 and SW2 are operated, the emergency control unit 160 outputs the control signal 154*a* through the output port 162*d* for the straight travel control valve and the control signal 152*ba* through the output port 162*b* for the second electric hydraulic pump as indicated with a solid line.

For reference, the electricity supplied from the regular power source 164 is adjusted to an appropriate value through the appropriate resistors R1, R2, R3, and R4 arranged on a connection circuit. For example, a value of the electricity supplied during an emergency situation may be determined by adjusting a size of resistance within the emergency control unit 160.

In the case of FIG. 7, the resistor R3 determines a size of electricity supplied to the output port 162*d* for the straight travel control valve, and the resistor R4 determines a size of electricity supplied to the output port 162*b* for the second electric hydraulic pump.

Figure 3:
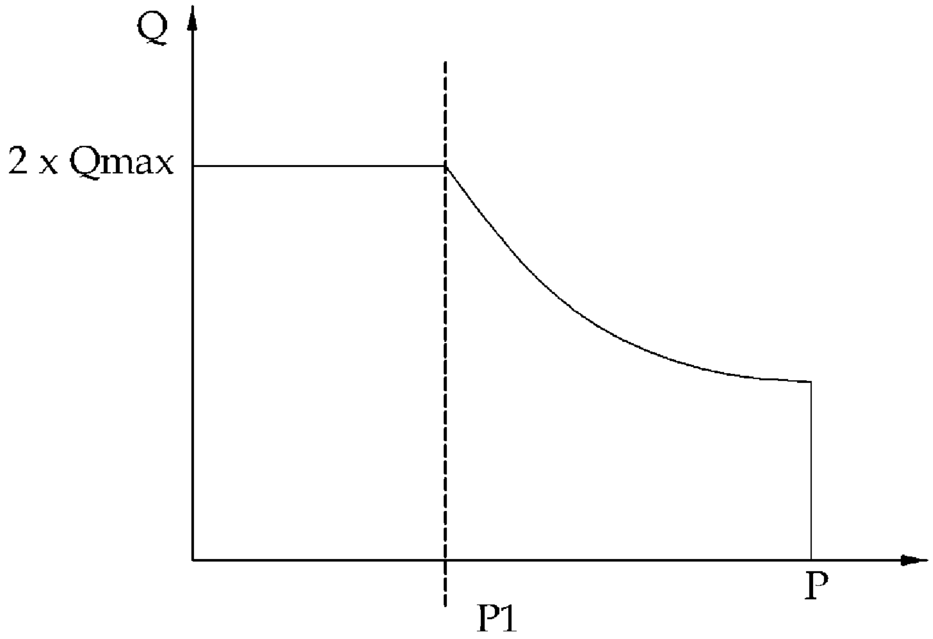
FIG. 3 is a graph illustrating a relationship between pressure and the quantity of flow when the emergency control unit is operated in the hydraulic system of FIG. 1.
Figure 9:
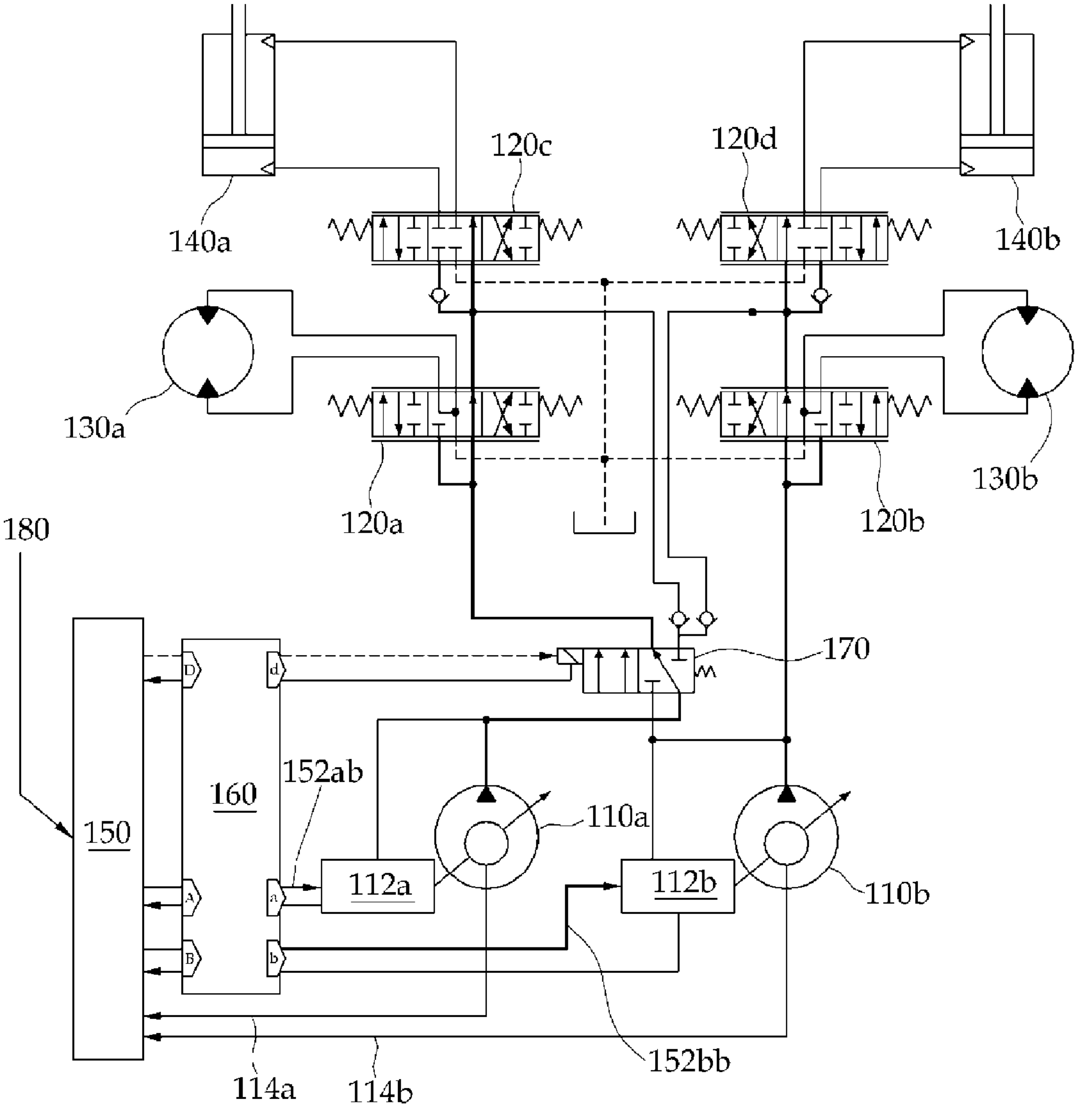
FIGS. 9 and 10 are a hydraulic circuit diagram of a corresponding hydraulic system and a logic circuit diagram of an emergency control unit in a case where the amount of load of a working machine is low load.
Figure 10:
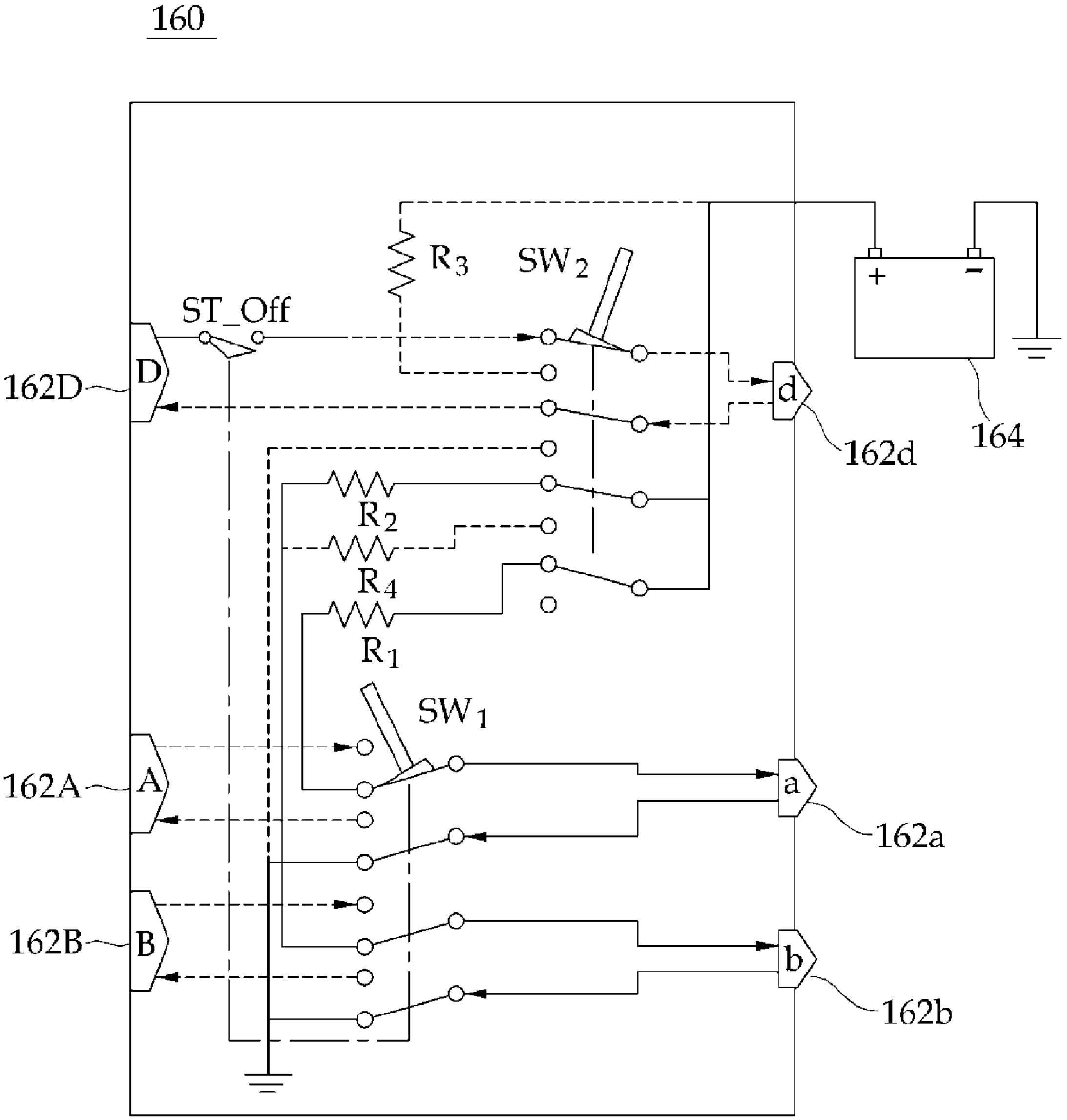

Next, FIGS. 9 and 10 are a hydraulic circuit diagram of the hydraulic system and a logic circuit diagram of the emergency control unit thereof in a case where low load work is required. In this case, a correlation between the quantity of flow and pressure is substantially the same as that of FIG. 3 illustrating the case of the related art.

As illustrated in FIG. 9, in the case of the low load work, the emergency control unit 160 simultaneously drives the first electric hydraulic pump 110*a* and the second electric hydraulic pump 110*b*, so that the emergency control unit 160 may be selectively operated so as to perform the low load work of the related art.

For example, in FIG. 9, the emergency control unit 160 outputs a control signal 152*ab* for the first electric hydraulic pump 110*a* and a control signal 152*bb* for the second electric hydraulic pump 110*b*. Accordingly, since the two pumps are driven similar to the related art, the working oil is also supplied with the maximum quantity of flow (that is, 2×Qmax), and thus the load work corresponding to the predetermined pressure (for example, the pressure P1) may be performed similar to the related art. Further, in this case, the supply path of the working oil is expressed with a thick solid line of FIG. 9.

In the meantime, in the case of the low load work, the emergency control unit 160 is operated as illustrated in FIG. 10, thereby outputting the required control signals 152*ab* and 152*bb*. FIG. 10 represents a state in which only the first switch SW1 is operated in the circuit diagram of FIG. 5.

The first switch SW1 is operated, so that the disconnection valve ST_Off for the straight travel control valve is driven, and thus the output port 162*d* for the straight travel control valve is disconnected, and simultaneously the regular power source 164 is connected for the output ports 162*a* and 162*b* for the first and second electric hydraulic pumps.

Accordingly, in a case of FIG. 10 in which only the first switch SW1 is operated, the emergency control unit 160 outputs the control signal 152*ab* through the output port 162*a* for the first electric hydraulic pump and the control signal 152*bb* through the output port 162*b* for the second electric hydraulic pump as indicated with a solid line.

Also, the electricity supplied from the regular power source 164 is adjusted to an appropriate value through the appropriate resistors R1, R2, R3, and R4 arranged on a connection circuit, and thus a value of the supplied electricity may be determined.

In the case of FIG. 10, the resistor R1 determines a size of electricity supplied to the output port 162*a* for the first electric hydraulic pump, and the resistor R2 determines a size of electricity supplied to the output port 162*b* for the second electric hydraulic pump.

As described above, the present disclosure relates to the hydraulic system of the construction machine using the electric hydraulic pump, and especially, to the emergency control unit capable of temporarily controlling the electric hydraulic pump with a predetermined condition instead of the electronic control unit when the electronic control unit controlling the electric hydraulic pump fails to operate, and especially, is characterized in the hydraulic system including the emergency control unit which is selectively operated for low load work and high load work according to the amount of load required when the electronic control unit fails to operate.

Accordingly, even in a case where the electronic control unit fails to operate, the present disclosure may perform emergency work, such as finishing the work by driving the working machine or making the construction machine travel for moving the construction machine located in a dangerous region to a safe area.

As described above, the emergency control unit of the present disclosure is characterized in that the emergency control unit may appropriately drive the electric hydraulic pump in response to each case by selectively outputting the predetermined control signal based on a case where the low load work is performed and a case where the high load work is performed according to the amount of load of the working machine required when the electronic control unit fails to operate.

To this end, the present disclosure outputs the control signal in accordance with the predetermined two types of settings (the low load work corresponding to the pressure P1 and the high load work corresponding to the pressure P2, in which P1 is smaller than P2) for the straight travel control valve and the first and second electric hydraulic pumps, so that the construction machine may be effectively driven for both the low load work and the high load work.

The hydraulic system of the construction machine according to the present disclosure may be used for temporarily driving a construction machine when an electronic control unit controlling an electric hydraulic pump fails to operate.

Although the present disclosure has been described with reference to exemplary and preferred embodiments, workers skilled in the art will recognize that changes may be made in form and detail without departing from the spirit and scope of the disclosure.

The invention claimed is:

1. A hydraulic system of a construction machine comprising an emergency control unit for an electric hydraulic pump, the hydraulic system comprising:

first and second electric hydraulic pumps, which are pressure control type variable capacity pumps;

a plurality of main control valves configured to selectively control a flow of working oil discharged from the first and second electric hydraulic pumps;

a plurality of working machines and first and second travel motors driven by the working oil supplied from corresponding main control valves among the plurality of main control valves;

a straight travel control valve configured to set a supply path of the working oil supplied to the first and second travel motors;

an electronic control unit configured to control the quantity of outlet flow of the working oil of the first and second electric hydraulic pumps by outputting pressure control electric signals for the first and second electric hydraulic pumps based on flow signals of the first and second electric hydraulic pumps and an operation signal of a joystick; and the emergency control unit configured to output the predetermined pressure control electric signals for the first and second electric hydraulic pumps when the electronic control unit fails to operate, wherein the emergency control unit is configured to selectively control the quantity of outlet flow of the first and second electric hydraulic pumps according to the amount of load of the working machines, and wherein when the amount of load of the working machine is a low load, the emergency control unit is configured to output the predetermined pressure control electric signal with the same pressure for the first and second electric hydraulic pumps, and when the amount of load of the working machine is a high load, the emergency control unit is configured to output the predetermined pressure control electric signal with pressure, which is higher than that of the case of the low load, for one pump between the first and second electric hydraulic pumps.

2. The hydraulic system of claim 1, wherein when the amount of load of the working machine is the high load, the emergency control unit is configured to output a driving electric signal for the straight travel control valve to drive the straight travel control valve.

3. The hydraulic system of claim 2, wherein the emergency control unit includes an electric circuit unit including:

respective output ports configured to output electric signals to the straight travel control valve, and the first and second electric hydraulic pumps;

respective input ports connected with the respective output ports through a predetermined circuit, and configured to receive corresponding electric signals of the electronic control unit; and a regular power source connected with the respective output ports through switches arranged on the predetermined circuit, and configured to output a predetermined electric signal when the electronic control unit fails to operate, wherein the electric circuit unit is configured to control an operation of the switches according to the amount of load of the working machine to selectively supply the predetermined electric signal to the output ports.

4. The hydraulic system of claim 3, wherein the switches are configured to operate the first and second electric hydraulic pumps for the low load, and operate only one pump between the first and second electric hydraulic pumps while driving the straight travel control valve for the high load.

* * * * *